United States Patent
Smith et al.

(10) Patent No.: US 12,154,113 B1
(45) Date of Patent: Nov. 26, 2024

(54) TRANSACTION MANAGEMENT BASED ON SENSOR DATA

(71) Applicant: United Services Automobile Association (USAA), San Antonio, TX (US)

(72) Inventors: Arthur Quentin Smith, Fredericksburg, TX (US); John C. Hopkins, III, San Antonio, TX (US)

(73) Assignee: United Services Automobile Associatio (USAA), San Antonio, TX (US)

( * ) Notice: Subject to any disclaimer, the term of this patent is extended or adjusted under 35 U.S.C. 154(b) by 53 days.

(21) Appl. No.: 17/507,552

(22) Filed: Oct. 21, 2021

Related U.S. Application Data (63) Continuation of application No. 15/452,135, filed on Mar. 7, 2017, now Pat. No. 11,157,906.

(60) Provisional application No. 62/305,721, filed on Mar. 9, 2016.

(51) Int. Cl.
G06Q 20/40 (2012.01)
G06Q 20/32 (2012.01)

(52) U.S. Cl.
CPC ... G06Q 20/40145 (2013.01); G06Q 20/3224 (2013.01)

(58) Field of Classification Search
CPC ......... G06Q 20/40145; G06Q 20/3224; G06Q 20/405
See application file for complete search history.

(56) References Cited

U.S. PATENT DOCUMENTS

| | | | |
|---|---|---|---|
| 2,092,770 A * | 9/1937 | Mavrogenis | H01J 19/02 363/116 |
| 7,028,076 B2 * | 4/2006 | Salloum Salazar | H04L 12/403 714/48 |
| 8,750,853 B2 | 6/2014 | Abramson et al. | |
| 10,210,569 B1 * | 2/2019 | Kim | G06Q 20/0855 |
| 11,157,906 B1 * | 10/2021 | Smith | G06Q 20/405 |

(Continued)

OTHER PUBLICATIONS

Cronin, J. et al., U.S. Appl. No. 62/094,885, filed Dec. 19, 2014; Specification, 16 pages. (Year: 2014).*

(Continued)

*Primary Examiner* — Bennett M Sigmond
*Assistant Examiner* — Bolko M Hamerski
(74) *Attorney, Agent, or Firm* — Fletcher Yoder, P.C.

(57) ABSTRACT

Techniques are described for managing transactions requested by a user, such management based on sensor data that is generated by sensor device(s) in proximity to the user. Biometric and/or other types of data may be generated using sensors that are included in a user device, worn by a user, and/or otherwise in proximity to the user. The data may be analyzed to determine a current physical, emotional, and/or intellectual state of the user, such as whether the user is intoxicated, exhausted, angry, depressed, under duress, experiencing dementia, and so forth. If a transaction is detected that conflicts with a previously specified constraint, such as a budget or spending rule of the user, and if the user is currently in an impaired state, action(s) may be taken to manage the transaction. Such action(s) may include blocking the transaction, delaying the transaction, and/or notifying another party to assist the user.

17 Claims, 4 Drawing Sheets

(56) References Cited

U.S. PATENT DOCUMENTS

| | | | | |
|---|---|---|---|---|
| 2002/0139842 | A1* | 10/2002 | Swaine | G07F 19/20 235/379 |
| 2008/0140569 | A1 | 6/2008 | Handel | |
| 2009/0002178 | A1 | 1/2009 | Guday et al. | |
| 2012/0316963 | A1* | 12/2012 | Moshfeghi | G06Q 20/20 705/14.58 |
| 2013/0254856 | A1* | 9/2013 | Krishan | H04L 63/083 726/6 |
| 2013/0331132 | A1 | 12/2013 | Goliszewski et al. | |
| 2014/0109185 | A1 | 4/2014 | Burke | |
| 2014/0112540 | A1* | 4/2014 | el Kaliouby | G06Q 30/0271 382/103 |
| 2015/0019409 | A1* | 1/2015 | Vagiri | G06Q 20/3221 705/39 |
| 2015/0257681 | A1* | 9/2015 | Shuster | A61B 5/18 600/595 |
| 2015/0347734 | A1* | 12/2015 | Beigi | H04L 9/3268 726/28 |
| 2015/0348162 | A1* | 12/2015 | Morris | G06Q 30/0631 705/26.7 |
| 2016/0189149 | A1* | 6/2016 | MacLaurin | G06Q 20/40145 705/44 |
| 2016/0205244 | A1* | 7/2016 | Dvortsov | H04M 19/04 455/414.1 |
| 2016/0314471 | A1* | 10/2016 | Gerber | G06Q 20/4014 |
| 2017/0091764 | A1 | 3/2017 | Lloyd et al. | |
| 2018/0000414 | A1* | 1/2018 | Lowet | A61B 5/02055 |
| 2019/0147529 | A1* | 5/2019 | Wright | G06Q 40/06 705/36 R |
| 2019/0206424 | A1* | 7/2019 | Feast | H04W 4/14 |
| 2020/0234299 | A1* | 7/2020 | Lambert | G06Q 20/405 |

OTHER PUBLICATIONS

K. Yoshimizu, N. Takemura, Y. Iwai and K. Sato, "Multi-sensor-based ambient sensing system for the estimation of comfort/discomfort during desk work," 2014 IEEE/SICE International Symposium on System Integration, 2014, pp. 425-430, doi: 10.1109/SII.2014.7028076 (Year: 2014).*

Y. Dong, Z. Hu, K. Uchimura and N. Murayama, "Driver Inattention Monitoring System for Intelligent Vehicles: A Review," in IEEE Transactions on Intelligent Transportation Systems, vol. 12, No. 2, pp. 596-614, Jun. 2011, doi: 10.1109/TITS.2010.2092770 (Year: 2011).*

J. C. D. Lima, C. C. Rocha, I. Augustin and M. A. R. Dantas, "A Context-Aware Recommendation System to Behavioral Based Authentication in Mobile and Pervasive Environments," 2011 IFIP 9th International Conference on Embedded and Ubiquitous Computing, 2011, pp. 312-319, doi: 10.1109/EUC.2011.2. (Year: 2011).*

Stephan Sigg and Kai Kunze and Xiaoming Fu. Recent Advances and Challenges in Ubiquitous Sensing. Mar. 17, 2015. arXiv: 1503.04973 [cs.HC] (Year: 2015).*

H. Seo and H. K. Kim, "User Input Pattern-Based Authentication Method to Prevent Mobile E-Financial Incidents," 2011 IEEE Ninth International Symposium on Parallel and Distributed Processing with Applications Workshops, Busan, Korea (South), 2011, pp. 382-387, doi: 10.1109/ISPAW.2011.26 (Year: 2011).*

K. Yoshimizu, N. Takemura, Y. Lwai and K. Sato, "Multi-sensor-based ambient sensing system for the estimation of comfort/discomfort during desk work," 2014 IEEE/SICE International Symposium on System Integration, 2014, pp. 425-430, doi: 10.1109/SII.2014.7028076 (Year: 2014).

S. Sigg, K. Kunze and X. Fu, "Recent Advances and Challenges in Ubiquitous Sensing". Mar. 17, 2015. arXiv:1503.04973 [cs.HC] (Year: 2015).

* cited by examiner

TRANSACTION MANAGEMENT BASED ON SENSOR DATA

CROSS REFERENCE TO RELATED APPLICATION

The present disclosure is a continuation of U.S. patent application Ser. No. 15/452,135, titled "Transaction Management Based On Sensor Data," which was filed on Mar. 7, 2017, now U.S. Pat. No. 11,157,906 issued on Oct. 26, 2021, which claims priority to, U.S. Provisional Patent Application Ser. No. 62/305,721, titled "Transaction Management Based On Sensor Data," which was filed on Mar. 9, 2016, the entirety of each application is hereby incorporated by reference into the present disclosure for all purposes.

BACKGROUND

Mobile device users have access to a large number and variety of mobile applications. Such applications enable a user to engage in various activities, access information, request services, or perform other actions that, in the past, may have required the user to interact in person or by telephone call with a store clerk, customer service representative, or other individual. Although mobile applications may provide convenient and efficient ways to access services, such ready access may also cause problems. For example, a user may employ a mobile application to perform an action without taking time to carefully consider any potentially negative ramifications of that action. In some instances, a user may perform an action, while in a state of physical, mental, and/or emotional impairment, that the user would not have performed had they been unimpaired.

SUMMARY

Implementations of the present disclosure are generally directed to managing transactions based at least partly on generated sensor data. More specifically, implementations are directed to generating sensor data such as biometric data regarding the user, detecting transactions requested by the user, and blocking, delaying, and/or performing other action(s) regarding the transactions if the generated sensor data indicates that the user may be in an impaired physical, emotional, and/or intellectual state.

In general, innovative aspects of the subject matter described in this specification can be embodied in methods that includes operations of: receiving an indication of a transaction requested by a user; receiving sensor data indicating one or more characteristics of the user, the sensor data generated by one or more sensor devices in proximity to the user; determining a current state of the user based at least partly on the sensor data; accessing constraint information describing at least one constraint on transactions of the user; and performing at least one action to manage the transaction, the at least one action based on determining that the requested transaction conflicts with the at least one constraint, based on the current state of the user.

Implementations can optionally include one or more of the following features: the at least one action includes preventing the transmission, over a network, of a signal to initiate the transaction; determining that the requested transaction conflicts with the at least one constraint includes determining a competency level of the user based on the current state of the user, and determining whether the requested transaction is allowed, in view of the at least one constraint, based on the competency level of the user; the transaction is a purchase requested by the user; the transaction is an alteration of a security setting requested by the user; receiving an indication of a transaction includes determining a current location of the user, and determining the transaction that is associated with the current location; the sensor data includes biometric data generated by at least one biometric sensor of the one or more sensor devices; the operations further include transmitting a signal to instruct the at least one sensor device to begin generating the sensor data in response to receiving the indication of the requested transaction; the at least one action includes one or more of blocking the transaction, delaying the transaction for a time period, or transmitting, over a network, a message to at least one other user, the message notifying the at least one other user of the transaction requested by the user, and requesting approval of the transaction by the at least one other user; and/or the at least one constraint includes one or more of a spending rule, a budget, or a financial plan previously specified by the user.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following advantages. In traditional computing systems that manage transactions, a transaction may be backed out, rolled back, or otherwise undone if the user later decides that the transaction was a bad choice. The execution and/or subsequent rolling back of undesired transactions may consume processing power, memory capacity, storage space, network capacity, and/or other computing resources. By preventing particular transactions if the user is impaired and/or if the transactions violate previously established constraints, implementations avoid the wasteful consumption of computing resources that would otherwise be caused by executing then backing out the transactions. Further, in instances where the transaction would involve the transmission of data over a network, barring the transaction (when the user is in an impaired state) prevents such a transmission, thus reducing network traffic and freeing bandwidth for other communications. Moreover, implementations of the present disclosure prevent unwanted disclosure of personal data, allow computing resources to perform other tasks, reduce data fragmentation, and reduce the consumption of resources that may be caused by the performance of security tasks such as deleting unwanted tracking cookies, remediating viruses, and preventing other security risks.

Moreover, implementations can capture and record situational data for post-event analysis of situations by the user or other individual such as a friend, family member, doctor, and so forth. The situational data can be examined to identify and prevent fraud schemes, cyber-security threats, money laundering, and/or other illegal activities. The data can also be used to identify and implement improvements in user processes and/or user experience including, such as streamlining processes, making functional improvements, and/or eliminating errors. The data can be used to optimize environmental scanning, data collection, data filtering, data storage, and/or data analysis, and thus use computer memory, processor, storage, data transfer capacity, and/or other computing resources more optimally than traditional solutions.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are directed to systems, devices, methods, and computer-readable media for managing transactions based at least partly on sensor data or other data regarding a user. In response to an indication that a user has initiated a transaction, such as a request for a quote, an inquiry, a purchase, analysis modules may analyze sensor data and/or other types of data to determine a current physical, mental, and/or emotional state of the user. In some implementations, biometric data may be generated and analyzed to determine a physical state of the user, such as whether the user is intoxicated, fatigued, in pain, hungry, thirsty, sleepy, and so forth. Such data may also be analyzed to determine a mental state of the user, such as whether the user is suffering from dementia or is in a manic phase of a bipolar cycle. In some examples, the data may be analyzed to determine an emotional state of the user, such as whether the user is angry, sad, depressed, happy, scared, nervous, suspicious, excited, under duress, and so forth.

Based on the determined state of the user, one or more actions may be performed to manage the transaction. Such action(s) may include but are not limited to blocking a transaction, delaying a transaction, notifying the user and/or other individual(s), and/or subjecting the user to one or more tests to validate the emotional, physical, and/or intellectual state of the user. For example, a purchase, funds transfer, or other financial transaction may be blocked based on a determination that the user is intoxicated when initiating the transaction. In some implementations, the action(s) may include requesting additional confirmation of the transaction from the user and/or other(s). For example, a stakeholder, physician, family member, guardian, attorney, accountant, or other party may be notified to request their intervention, approval, authentication, and/or awareness. In some instances, action(s) may include changing transaction limits, such as increasing minimum limits or decreasing maximum limits.

In some implementations, the determination of action(s) may be based on the state of the user as well as one or more constraints that have been previously specified for the user. In some instances, the user may have previously set up a budget, financial plan, savings goals, and/or other constraints with a financial institution to help manage the user's finances, and action(s) may be performed if a transaction at least partly violates or is contrary to such a budget, plan, goals, and so forth. For example, the user may have previously indicated that they are saving for college tuition, and may have indicated a target amount to be saved in a particular time period. Action(s) may be performed to block or delay a transaction if the user is in an impaired state (e.g., intoxicated) and if the transaction would cause the user to not meet their goal. As another example, a transaction may be blocked if the user is intoxicated or otherwise impaired while attempting to make a purchase that would exceed the user's monthly budget. In this way, implementations provide a safeguard to prevent the user from making a decision that is contrary to their previously stated constraint(s), when the user is intoxicated or otherwise in an impaired state.

Figure 1:
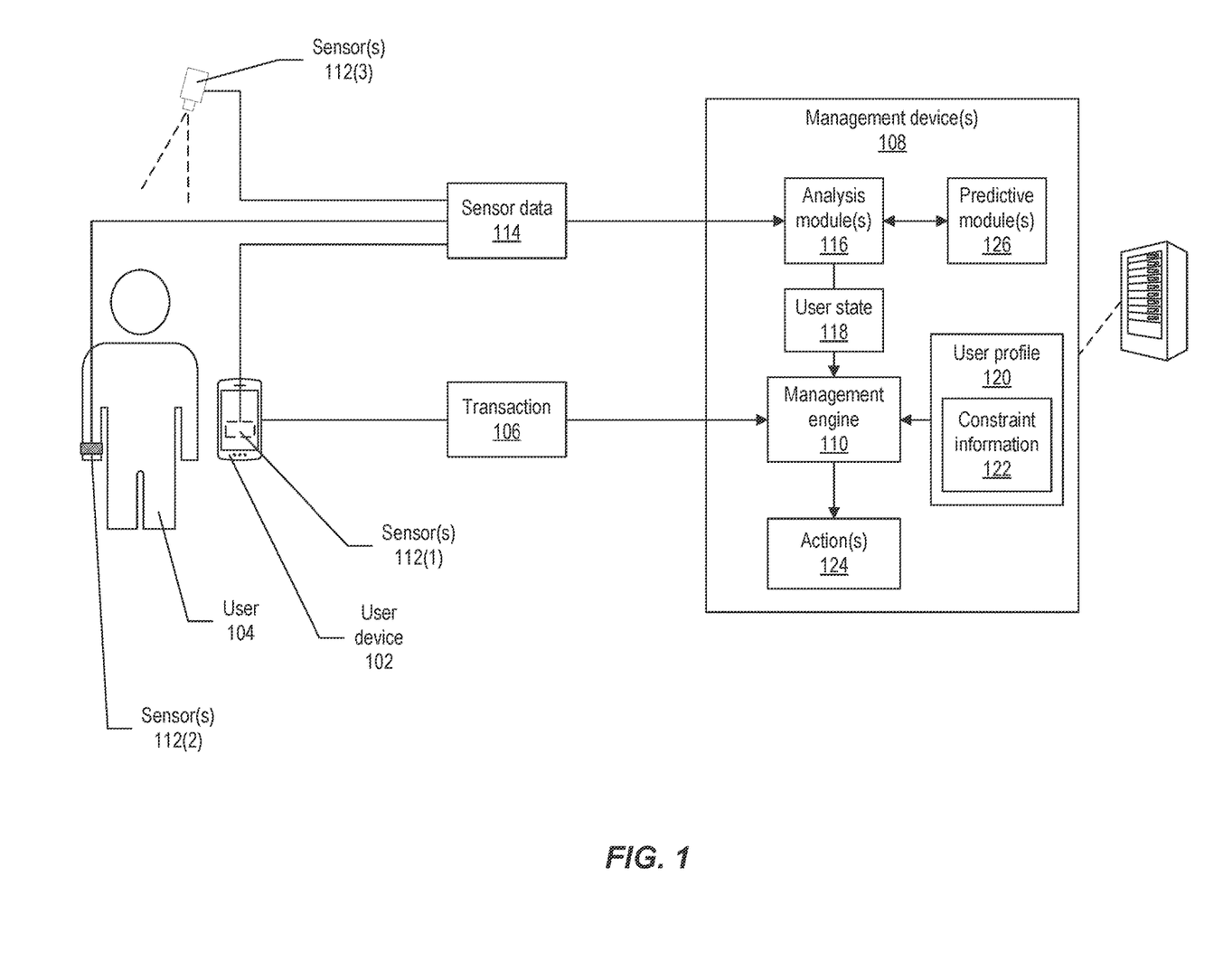
FIG. 1 depicts an example system for managing transactions based on sensor data and/or other data, according to implementations of the present disclosure.

FIG. 1 depicts an example system for managing transactions based on generated sensor data and/or other data, according to implementations of the present disclosure. As shown in the example of FIG. 1, the system may include a user device 102. The user device 102 may be any appropriate type of computing device. In some examples, the user device 102 is a mobile and/or portable computing device, such as a smartphone, tablet computer, wearable computer, smart glass, vehicle onboard system and so forth. The user device 102 may also be a less mobile device, such as a desktop computer, laptop computer, smart appliance, smart television, internet-of-things (IoT) device, gaming console, and so forth. The user device 102 may be owned by, operated by, and/or otherwise associated with a user 104.

The user 104 may request a transaction 106. A request for a transaction 106 may be an initiation of the transaction, an attempt to perform the transaction, and/or a transmission of a communication indicating a transaction to be performed. In some examples, the transaction 106 may be a purchase of product(s) or service(s). The transaction 106 may be a financial transaction, such as a funds transfer from a financial account (e.g., bank account) of the user 104 to another entity, or between accounts of the user 104. The transaction 106 may be an action requested by the user 104 to manage a financial account management, such as opening or closing a bank account, granting permission to access account information, and so forth. In some examples, the transaction 106 is an action requested to manage an investment account, such as a liquidation of an investment fund or the sale or purchase of stocks, bonds, or other types of investments. In general, a transaction 106 may involve the user 104 requesting the transferring of funds or other forms of value to another entity. Implementations also provide for the management of other types of transactions 106. For example, a transaction 106 may include the user 104 making, or attempting to make, a legally binding promise, such as signing a contract, assigning beneficiaries for a will or trust, assigning an executor for a will, assigning a trustee or trustor, and so forth. A transaction 106 may also include one or more of a (e.g., real) property transfer, a sale, a purchase, financing or refinancing a loan, a change to a financial will, a change to living will, assigning power of attorney, a tax submission, a title transfer, and/or a change in authentication criteria (e.g., user ID, password, images, biometric data, etc.). A transaction 106 may also be any other suitable type of (e.g., non-financial) transaction requested by the user 104, such as a requested transaction to change security settings (described further below).

In some examples, as shown in FIG. 1, the user 104 may employ the user device 102 to initiate the transaction 106. For example, the user 104 may access an e-commerce application or web site using the user device 102 and, through the application or web site, request the purchase of a product or service. As another example, the user 104 may employ the user device 102 to access an application (e.g., an app) provided by a financial services company such as a bank, insurance company, and/or investment services company. Through the application, the user 104 may request transaction(s) 106 to transfer funds, open or close accounts, or otherwise manage the user's financial accounts. The transaction 106 may also be initiated by the user 104 through other channels. For example, the transaction 106 may be a credit card and/or debit card purchase at a store.

An indication of the transaction 106 may be communicated over one or more networks to a management engine 110 executing on one or more management devices 108. The management device(s) 108 may include any appropriate number and type of computing devices, such as server device(s), distributed computing device(s) (e.g., cloud computing server(s)), and so forth. In some examples, the management engine 110 may handle at least a portion of the transaction 106, such that transaction 106 itself is the indication of the transaction received by the management engine 110. For example, the transaction 106 may be a purchase through an online shopping site, and the management engine 110 may execute on management device(s) 108 that are component(s) of an e-commerce computing system that provides the online shopping site. As another example, the transaction 106 may be a purchase using a credit card, and the management device(s) 108 may be component(s) of a financial services system (e.g., internal system or third party system) that manages credit card transactions or other types of financial services. In some examples, the transaction 106 may be processed by other external systems and/or services, and the management engine 110 may receive a communication that provides an indication of the transaction 106. The communication may describe any relevant aspects of the transaction 106. For example, in a purchase transaction the communication may indicate information such as the amount, the product or service being purchased, the user 104, the location of the transaction 106, the merchant name, and so forth. Other types of information may be communicated relevant to other types of transactions.

The system may include and utilize any appropriate number of sensors 112, also described as sensor device(s). The sensor(s) 112 may be in proximity to the user 104 and may be configured to generate sensor data 114 regarding the user 104. The generation of data, such as sensor data, may include the collection of the data by sensor device(s) 112. The generation of data may also include the determination of the data based on collected sensor data, such that the generated data is the output of the processing of the collected sensor data. The sensor data 114 may describe physiological and/or other characteristics of the user 104. The sensor data 114 may also describe the environment near the user 104, such as lighting conditions, weather conditions, location, and so forth. In some implementations, the user device 102 may include one or more sensors 112(1). For example, the sensor(s) 112(1) may include camera(s) or other imaging device(s) configured to generate image(s) and/or video of the user's face or other body parts. The sensor(s) 112(1) may also include microphone(s) or other audio input device(s) configured to capture and/or record audio data such as the user's speech, heartbeat, or other sounds of the user 104 and/or sounds from the user's proximal environment. The sensor data 114 may also describe oxygen level, the presence and/or concentration of other gases, the presence of alcohol, marijuana, or tobacco, the presence of inhalants or odors, the temperature, the altitude, the air pressure, the humidity, and/or brain waves (e.g., neural activity) of the user 104. The sensor(s) 112(1) may include accelerometer(s), gyroscope(s), or other sensor(s) configured to generate data describing the movement(s) of the user device 102. The sensor(s) 112(1) may include transceiver(s) configured to detect signals that indicate a location of the user device 102. For example, the sensor(s) 112(1) may be configured to detect signals from a satellite-based navigation system such as the global positioning system (GPS). The sensor(s) 112(1) may be included in a portable and/or mobile device such as a smartphone, tablet computer, and so forth. The sensor(s) 112(1) may also be included in a wearable computing device such as a wristwatch computing device, smart glasses or headsets, smart contact lenses, virtual reality (VR) devices, and so forth.

The system may also include one or more sensors 112(2) that are carried, worn, and/or otherwise transported by the user 104 but that are external to the user device 102. For example, the sensor(s) 112(2) may be components of smart clothing and/or a wearable fitness device, and may be configured to measure the user's pulse, blood pressure, perspiration level, blood sugar level, brain wave activity, or other physiological characteristic(s) of the user 104. The sensor(s) 112(2) may also include accelerometer(s), gyroscope(s), or other sensor(s) configured to detect movement(s) of the user 104 and/or one or more of the user's various body parts. In some examples, the sensor(s) 112(2) may be embedded and/or implanted in the user 104, e.g., as components of a medical device such as a heart pacemaker, a medical monitor, a medication dispenser, a prosthetics (e.g., smart prosthetic), and/or a device that uses or enables virtual reality. The sensor(s) 112(2) may communicate the sensor data 114 to the user device 102, which may communicate the sensor data 114 to the management device(s) 108. Alternatively, the sensor(s) 112(2) may communicate their sensor data 114 to the management device(s) 108 without using the user device 102 as an intermediary.

The system may also include one or more sensors 112(3) that are in proximity to the user 104 and not carried and/or worn by the user 104. For example, the sensor(s) 112(3) may include one or more cameras or other imaging device(s) that generate image(s) and/or video of the user 104 when the user 104 is in proximity to the sensor(s) 112(3). The sensor(s) 112(3) may also include microphone(s) or other audio input device(s) to capture audio data such as speech, heartbeat, and/or other sounds of the user 104, and/or ambient sounds in proximity to the user 104. In some instances, the captured audio data may be stored in memory on the user device 102 or elsewhere. In some instances, the sensor(s) 112(3) may be components of smart appliances, home entertainment systems (e.g., television, stereo, gaming consoles, etc.), and/or internet-of-things (IoT) devices that are in the user's home, workplace, or elsewhere. The sensor(s) 112(3) may be components of an in-vehicle computing device such as an automotive computer or telematics device in a vehicle that is owned and/or employed by the user 104. The sensor(s) 112(3) may have a fixed location, such as a fixed traffic camera. The sensor(s) 112(3) may also have a variable location, such as sensor(s) that are component(s) of a drone, blimp, or other vehicle. In some instances, a sensor 112(3) may be a component of a user device carried by an individual other than the user 104, or may be worn, implanted, or otherwise conveyed by the other individual.

Each of the various types of sensor data 114 described herein may be generated by one or more of the sensor(s) 112(1), 112(2), or 112(3). In some instances, the sensor data 114 includes biometric data that indicates one or more physiological characteristics of the user 104, such as blood pressure, pulse or heart rate, body temperature, perspiration, eye movement, brain wave or neural activity, blood sugar level, changes in skin tone (e.g., due to a flush response indicating a blood pressure change), and so forth. The sensor data 114 may indicate one or more bodily movements (e.g., fidgeting, foot tapping, etc.) of the user 104, and/or a location of the user 104. The sensor data 114 may also include images and/or video of the user's face, shoulders, or other part(s) of the body. The sensor data 114 may include audio data such as the captured speech and/or heartbeat of the user 104. Sensor data 114 may also include image(s), video data, and/or audio data captured from the user's environment, such as images of the user's surroundings, images of objects being manipulated by the user 104, audio data of ambient noise proximal to the user 104, and so forth.

The sensor data 114, and/or other data generated by the user device 102, may be received over one or more networks by one or more analysis modules 116 executing on the management device(s) 108 or elsewhere. The sensor data 114 and/or other data may be analyzed by the analysis module(s) 116 to determine a user state 118 for the user 104. The user state 118 may be a physical state indicating that the user 104 is fatigued, intoxicated, asleep, and so forth. The user state 118 may be a mental state indicating that the user 104 is manic, depressed, experiencing dementia, not lucid, and so forth. The user state 118 may be an emotional state indicating that the user 104 is sad, angry, enraged, happy, and so forth. The user state 118 may include a description of the user's physical, mental, and/or emotional state. The analysis module(s) 116 may employ various techniques to determine the user state 118 based on the sensor data 114 and/or other information. Such techniques may include, but are not limited to, one or more of the following.

Images of at least a portion of the user's face (e.g., mouth, eyes, etc.) and/or posture (e.g., shoulders) may be analyzed using mood recognition analysis techniques to determine the emotional state of the user 104, such as whether the user 104 is stressed, relaxed, happy, sad, angry, calm, scared, and so forth. In some implementations, image(s) of at least a portion of the user's hands, fingers, wrists, and/or arms may also be captured, and gestures made by the user 104 may be analyzed to determine the user's emotional state. For example, an agitated user may gesture differently and/or more dramatically than they would normally.

Images of the user's body may also be captured and analyzed to determine how and/or whether the user 104 is currently dressed. For example, it is known that the user 104 typically works during a week day, and the user 104 is dressed in pajamas on a weekday afternoon, such atypical attire may indicate an atypical emotional, mental, or physiological state of the user 104. The grooming state (e.g., hair, facial hair, neatness, cleanliness, etc.) of the user 104 may also be examined to determine the user's state. For example, if the user 104 is normally clean shaven, but image(s) of the user 104 show one or more days' worth of facial hair stubble, that may indicate an atypical emotional, mental, or physiological state of the user 104. The state of the user's hair (e.g., whether or not the hair is combed, tied, or otherwise arranged), whether the user is currently wearing glasses (or contact) lenses, cleanliness (e.g., clean or dirty face, hands, fingernails, etc.), and/or other information may also be determined by analyzing image(s) of the user 104. The user's current state of attire and/or grooming may be compared to a known typical state of attire and/or grooming of the user 104, and that comparison may be used to infer a current (typical or atypical) physical, emotional, and/or mental state of the user 104.

Audio data of the voice of the user 104 may be analyzed using audio analysis techniques to detect emotional indicators in the user's voice and/or language usage.

Audio data of the voice of the user 104 may be transcribed using speech-to-text (STT) software, and the output text may be analyzed using natural language processing (NLP), semantic analysis, keyword recognition, or other methods to detect indications of stress, anger, and/or other emotions in the user's language. The audio data and/or transcribed audio data may also be analyzed to determine whether the user 104 is not lucid, experiencing dementia, or otherwise mentally impaired (e.g., if the user's speech does not make sense). The audio data and/or transcribed audio data may also be analyzed to determine whether the user 104 is intoxicated.

Analysis of the speech of the user 104 includes, but is not limited to, identification and analysis of the particular words, phrases, and/or sentences spoken by the user 104. Analysis of the user's speech may also include analysis of the tone, clarity, volume, speed, and/or other characteristics of the user's speech that may be captured in the audio data gathered by the audio sensor device(s). Sounds made by the user 104, other than speech, may also be captured and analyzed. For example, the captured and analyzed audio data may include noises inadvertently or intentionally made by the user 104, such as coughs, sneezes, laughter, snores, shouts, sounds of the user tapping their feet or hands, making sounds with an object (e.g., tapping a pencil or other object on a surface), fidgeting, walking, running, performing other movements, and so forth. The captured and analyzed audio data may also be biometric data such as heartbeat, pulse, and so forth.

Movement data, indicating movements of the user 104 and/or the user device 102, may be analyzed to determine a physical, emotional, and/or mental state of the user 104. For example, movement data indicating that the user 104 is jittery may indicate that the user 104 is stressed, tense, angry, or in some other emotional state. As another example, the walking movements, swaying, gestures (e.g., with hands, arms, wrists, and/or fingers), and/or other movements of the user 104 and/or the user device 102 may be characteristic of individuals who are intoxicated. The position(s), articulations (e.g., a flat hand, pointed finger, bend fingers, fist, or other configurations of body parts), and/or movements of hands, arms, wrists, and/or fingers may also indicate intoxication or some other state of the user 104. Facial movements, positions, and/or articulations may also be analyzed, such as facial tics, eyebrow movements, smiling or frowning, lip or tongue movement, eye movements, nostril flare, eyes open, shut, wide, or squinting, eyebrow position and/or movement, and so forth.

Movement data and/or location data may be employed to determine whether the user 104 is balanced or unbalanced, steady or unsteady, stumbling, falling over, or otherwise moving in an erratic manner, which may indicate a degree of intoxication, exhaustion, and/or mental impairment. Movement data describing the movement of a vehicle may be employed to determine the user's driving style, speed, level of alertness, and/or other characteristics which may indicate a presence or absence of intoxication, the user's emotional state, the user's level of fatigue, and/or other states.

Biometric data, indicating a physiological and/or health status of the user 104, may be generated and analyzed to determine the user's level of stress, anger, happiness, or other emotional states. As described above, biometric data may measure one or more of brain wave activity, blood pressure, heart rate, body temperature, perspiration, blood sugar level, and so forth. Such biometric data may also be analyzed to determine whether the user 104 is fatigued, awake, asleep, or in some other physical state. The biometric data may also be analyzed to determine whether the user 104 is intoxicated.

A user state 118 may include any combination of a physical, mental, and/or emotional state. For example, the generated data 114 may indicate that the user 104 is under duress, e.g., being threatened with physical harm if the user 104 does not initiate a transaction 106. Duress may be indicated by data 114 showing particular physical, emotional, and/or intellectual characteristics. A determination of duress may prompt an action 124 to send assistance to the current location of the user 104.

In some implementations, the analysis module(s) 116 may employ other data, instead of or in addition to the sensor data 114, to determine the user state 118. In some examples, inputs (e.g., text input, clicks, swipes, other gestures, etc.) of the user 104 through an application executing on the user device 102 may be analyzed. For example, heightened emotions (e.g., anger, stress, etc.) may lead to more misspellings or grammar errors, use of different vocabulary (e.g., obscenities), use of a higher proportion of shorter words, different punctuation, and so forth. A change in the emotional state of the user 104 may also lead to a change in typing speed, a change in the frequency of clicks, or other changes in gestures made to a user interface. The analyzed text data may be entered by the user 104 in through a user interface of the application, in a chat and/or instant messaging (IM) session, as an email, or otherwise. In some instances, characteristics of the text such as misspellings, input speed, vocabulary, and so forth may indicate that the user 104 is intoxicated.

In some implementations, the management engine 110 may employ the user state 118 to determine one or more actions 124 to be taken to manage the transaction 106. The action(s) 124 are described further with reference to FIG. 2. In some implementations, the management engine 110 may determine action(s) 124 based on the user state 118 and information in a user profile 120 associated with the user 104, such as the constraint information 122 describing one or more constraint(s) on the user's possible transactions. In some instances, the user 104 may have previously specified the constraint(s). For example, the user 104 may have specified a budget (e.g., weekly, monthly, yearly, etc.), a financial plan, a financial goal (e.g., save to buy a house, pay for college tuition, etc.), or other information intended to constrain the user's spending or other financial choices. Such constraint(s) may apply to short-term spending (e.g., daily, weekly, monthly, etc.), long-term spending (e.g., years, decades, lifetime, etc.), or any other suitable time scale.

Constraints may be specified with varying degrees of specificity. For example, a constraint may be in the form of a spending rule that constrains the user 104 to a particular spending range for a particular item or type of item (e.g., a maximum of $50 a week spent on food), or prevents the user 104 from spending on a particular item or type of item (e.g., no spending allowed at a gambling establishment). A constraint may be a budget that is less specific than a particular spending rule. For example, a user 104 may allow themselves a budget that limits total spending to $1000 per month. A constraint may be in the form of a financial plan that is less specific than either a budget or a spending rule. For example, a financial plan may describe goals for income and/or expenditures per week, month, or year, goals for saving toward a large purchase (e.g., house, car, etc.), goals for paying down or paying off debt, and so forth.

In some implementations, the analysis module(s) 116 may communicate with and/or include one or more predictive modules 126. The predictive module(s) 126 may employ any suitable data analytic technique(s) to predict activities of the user 104. Such activities may be predicted in advance in any suitable time scale, such as 30 minutes ahead, 60 minutes ahead, 24 hours ahead, and so forth. Such predictions may be made based on historic data regarding the user's routine or pattern of activities. Prediction(s) may also be based on recent behavioral changes detected for the user 104, marketplace trends, detected activities of friends, family members, and/or other acquaintances, an expected location of the user 104, and so forth. The predictive module(s) 126 may generate and maintain a behavioral model for the user 104, and deviations from the model may trigger action(s) 124 to be taken to manage transaction(s) 106 of the user 104.

In some implementations, the management engine 110 may employ a hierarchy of ranked levels to determine what action(s) 124, if any, are to be performed. The ranked levels may be associated with the user state 118, and each ranked level may be associated with a level of competency and/or alertness of the user 104 as indicated by the user state 118. For example, the ranked levels may include: level 1 (e.g., a highest state of competency and/or alertness), which may be required to perform stock trades; level 2 (e.g., a high state), which may be required to perform funds transfers and/or payments that exceed a threshold amount (e.g., $1500); level 3 (e.g., a normal state, where the user 104 may be taking certain medications); level 4 (e.g., below normal but tolerable state), in which payments and/or transfers may be allowed if below a threshold amount (e.g., $100); and/or level 5 (e.g., a lowest state of competency), in which transaction(s) 106 may be allowed if no minimum competency and/or alertness is required from the user 104. Implementations support the use of any suitable number and gradation of levels that are employed by the management engine 110 to determine action(s) 124.

Although examples herein describe action(s) 124 taken to control transaction(s) 106 such as financial transaction(s) (e.g., purchases, funds transfers, loan applications, etc.), implementations are not limited to such examples. In some instances, action(s) 124 may be taken to control other types of attempted or requested transaction(s). For example, a user 104 may attempt a transaction to alter security settings that control which users are authorized to access, and/or the permission levels to access, an application, account, Internet-of-Things (IoT) device, or other computing device. Altering security settings may include, but is not limited to, changing a password, user ID, login, personal identification number (PIN), or other authorization credential. As a particular example, implementations may bar the user 104 from changing a door code on an IoT device that controls a door locking mechanism, if the user 104 is determined to be in an impaired state. Similarly, the user 104 may be barred from changing a password on a firewall, an access code for a vehicle, an access code for a safe or vault, and so forth. The user 104 may be also prevented from changing access permissions when in an impaired state (e.g., intoxicated or under duress). For example, implementations may bar the user 104 from granting, to another individual, access or action permissions or privileges to an account or computing device if the user 104 is impaired.

Figure 2:
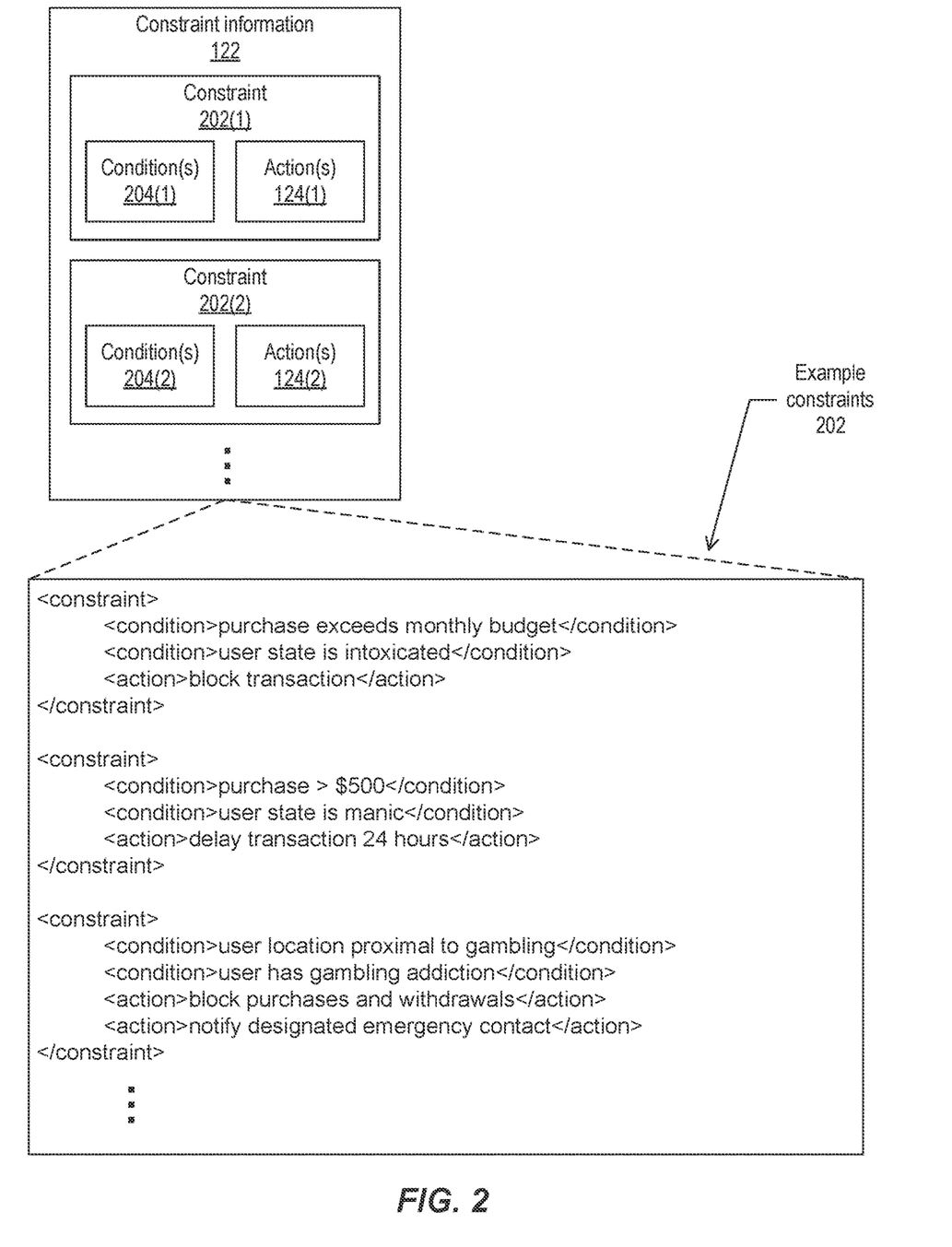
FIG. 2 depicts an example of constraint information that may be employed to manage transactions for a user, according to implementations of the present disclosure.

FIG. 2 depicts an example of constraint information 122 that may be employed to manage transactions 106 for a user 104, according to implementations of the present disclosure. As shown in the example of FIG. 2, the constraint information 122 may include any appropriate number of constraints 202. Each constraint 202 may include one or more conditions 204 to determine whether the constraint 202 has been violated, and one or more actions 124 to be performed if the constraint 202 has been violated. In some instances, the condition(s) 204 may include: financial-related condition(s) that are based on a budget, financial plan, financial goal, or other financial-related conditions specified by the user 104 and/or others; and/or state-related condition(s) that are based on the user state 118. In some implementations, the constraint information 122 may include a set of one or more constraints 202 for each of multiple users 104. In such instances, a constraint 202 may identify the particular user(s) 104 that are subject to the constraint 202.

In some instances, a constraint 202 may include a combination (e.g., logical combination) of financial-related condition(s), state-related condition(s), and/or other types of condition(s). For example, as shown in the example constraints 202 included in FIG. 2, a constraint 202 may indicate that a transaction 106 is to be blocked if the user 104 is currently in an intoxicated physical state and if the transaction 106 includes a purchase that exceeds a monthly budget or the item is prohibited or limited to certain providers or quantities. As another example, a constraint 202 may indicate that a transaction 106 is to be delayed for a period of time (e.g., 24 hours) if it includes a purchase that exceeds a predetermined threshold amount (e.g., greater than $500) and if the user 104 is currently in a manic mental state.

In some instances, a constraint 202 may include condition(s) 204 that are based on other information in the user profile 120. For example, the user profile 120 may indicate that the user 104 has an addiction to drugs, alcohol, gambling, shopping, and so forth. A constraint 202 may include user characteristic-related condition(s) alone or in combination with state-related and/or finance-related condition(s). For example, as shown in FIG. 2, a constraint 202 may be violated if the user 104 has a gambling addiction and if the user's current location is at or in proximity to a gambling establishment such as a casino, racetrack, card club, and so forth. Such a constraint 202 may also be violated if the user 104 accesses, or attempts to access, a gambling application (e.g., mobile app), web site, so other online gambling services. In this example constraint 202, if the constraint 202 is violated multiple actions 124 are performed, including blocking any purchases or withdrawals (e.g., automated teller machine withdrawal, credit card advances, etc.) while the user 104 is at the location, and sending a notification to an emergency contact individual associated with the user 104. A constraint may indicate a competency level, or range of competency levels, that are required for the requested transaction 106 to be allowed.

Although FIG. 2 depicts example constraints 202 that are described using metadata tags in a form of markup language, implementations are not limited to this example. Implementations support the use of any appropriate format for describing the constraint(s) 202 in the constraint information 122. Moreover, in some implementations the constraint(s) 202 may include dynamic variables in addition to or instead of static variables.

A constraint 202 may include information indicating how multiple condition(s) 204 are to be logically combined to determine whether the constraint 202 is violated. For example, the presence of multiple condition(s) A, B, and C in a constraint 202 may indicate that the associated action(s) 124 are to be performed if the logical combination (A AND B AND C) is satisfied. In some implementations, multiple condition(s) 204 may be combined with an OR operator. In some implementations, the constraint 202 may include one or more logical operators indicating how multiple condition(s) 204 are to be combined to apply the constraint 202. The constraint 202 may indicate one or more actions 124 to be performed if the condition(s) 204 in a constraint 202 are satisfied. The action(s) 124 may include, but are not limited to, one or more of the following.

Action(s) 124 may include blocking the transaction 106 so that it does not proceed. In instances where the transaction 106 has already been initiated, the transaction 106 may be discontinued and/or rolled back to a previous state.

Action(s) 124 may include delaying the transaction 106 for a predetermined period of time. For example, if the user 104 is intoxicated, angry, or fatigued, the transaction 106 may be delayed for 24 hours to allow the user 104 to become sober. The user 104 may then reconsider the transaction 106 with a possibly clearer head.

Action(s) 124 may include sending a notification to the user 104 and/or other individual(s), describing the transaction 106 and the user state 118 that may indicate why the transaction 106 may be a bad choice by the user 104 given the user's financial plan, budget, or goals, or given the user's characteristics (e.g., gambling addiction). In some implementations, another individual may be notified that the user 104 has initiated a transaction that violates or is contrary to one or more constraints 202. The notification may include appropriate information to enable the other individual to assist the user 104. For example, the notification may identify the user 104, indicate the user's location, describe the current user state 118 of the user 104, describe the transaction 106 that is being attempted, and/or other information. The notification may be communicated to the user 104 and/or other individual(s) using various techniques, such as email, text message, voice message, and so forth. In some examples, the user 104 may have previously indicated other individual(s) to receive notification(s), e.g., as emergency contact information stored in the user profile 120. For example, the user 104 may have indicated a spouse, guardian, adult child, sibling, other relative, caregiver, doctor, attorney, accountant, trust manager, trust management service, business partner, colleague, or other(s). In some examples, the other individual(s) may have been selected as an entity other than the user 104. For example, the other individual(s) may include a court-appointed guardian or caretaker.

Action(s) 124 may include administering a test to the user 104, e.g., through the user device 102, to determine whether the user 104 is actually impaired. For example, to check whether a user 104 is intoxicated the user 104 may be asked to speak a phrase which is captured by audio sensor device(s) and analyzed to determine whether the user 104 is slurring their words. As another example, the user 104 may be asked to solve a puzzle, answer questions, or otherwise interact with the interface of the user device 102 to determine whether the user 104 is impaired with regard to their physical, mental, and/or emotional state.

Figure 3:
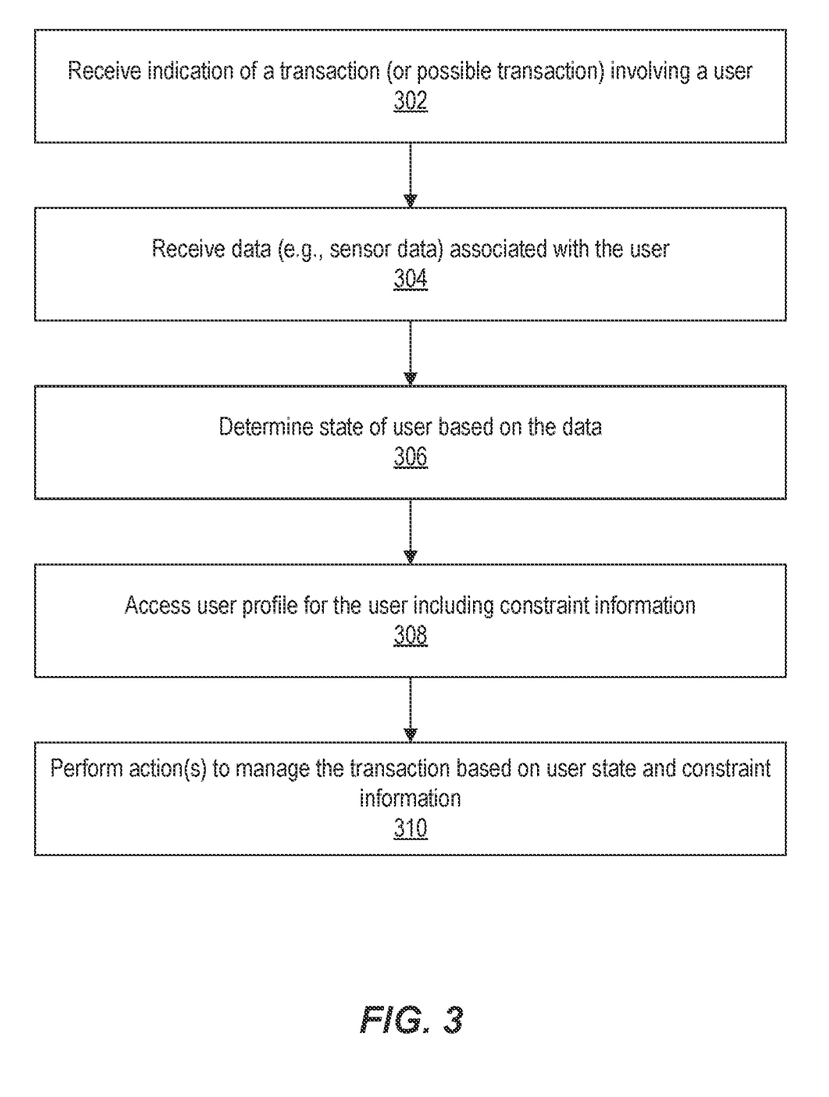
FIG. 3 depicts a flow diagram of an example process for managing transactions for a user, according to implementations of the present disclosure.

FIG. 3 depicts a flow diagram of an example process for managing transactions 106 for a user 104, according to implementations of the present disclosure. Operations of the process may be performed by one or more of the analysis module(s) 116, the management engine 110, and/or other software modules executing on the management device(s) 108, the user device 102, or elsewhere.

An indication of a transaction 106 may be received (302). As described above, the transaction 106 may involve a user 104, and may indicate the user's attempt to make a purchase, request a funds transfer, enter into a contract, and/or other transaction.

Data associated with the user 104 may be received (304). The data may include sensor data 114 generated by sensor device(s) 112. The data may also include other information, such as text, gestural inputs (e.g., clicks, double-clicks, swipes, pinches, etc.), voice input, haptic input, brain waves, eye movement, facial expressions, and/or other inputs made by the user 104 through an interface of the user device 102. The data received may also include a current location of the user 104 and/or user device 102.

The user state 118 may be determined (306) for the user 104 as described above. In some implementations, the user state 118 is determined in real time with respect to the generation of the data, such that the user state 118 is a current state of the user 104 at or near the time when the data was generated (e.g., during a time period that includes the time when the data was generated). Moreover, the user state 118 that is determined by being the state of the user 104 during a time period that includes a time when the user 104 requests the transaction 106. Accordingly, the user state 118 may be a current state of the user 104 at or near the time of the request for the transaction 106. Real time operations may include operations that are automatically executed, without requiring human input and without any intentional delay, taking into account the processing limitations of the computing system(s) performing the operations and the time needed to perform the operations. The data, such as the sensor data 114 describing the user 104, may be analyzed in real time with respect to the generation of the data. For example, there may be no intentional delay between the generation of the data and the analysis of the data, beyond the latency incurred in communicating the data over network(s) and performing the analysis operations on computing system(s). In some implementations, the user state 118 of the user 104 at various times may be stored and accessed later to determine trends and/or patterns in the user state 118 over time. The determined trends and/or patterns may be used to predict likely and/or possible future actions by the user 104.

The user profile 120 of the user 104 may be accessed (308). As described above, the user profile 120 may include the constraint information 122. The user profile 120 may also include various characteristics of the user 104, such as whether the user 104 has an addiction.

Based on the current user state 118, the constraint(s) 202 in the constraint information 122, and/or other information in the user profile 120, one or more actions 124 may be determined as described above. The action(s) 124 may be performed (310) to manage the transaction 106. In some instances, a determination may be made that multiple constraints 202 are violated based on a particular user state 118 and/or other information. In such instances, the action(s) 124 corresponding to each of the violated constraints 202 may be performed. In instances where multiple violated constraints 202 are associated with a same action 124, the particular action 124 may be performed once instead of redundantly performing the same action 124 multiple times.

In some implementations, a constraint 202 may indicate that particular action(s) 124 are to be performed if the transaction 106 deviates from and/or conflicts with a previously specified budget, financial plan, financial goal, or other criteria. In some implementations, the particular details of the attempted transaction 106 may be used to determine whether a constraint 202 has been violated, such that the transaction 106 is in conflict with the constraint 202. For example, a constraint 202 may indicate that action(s) 124 are to be performed if the user 104 attempts, e.g., while in an impaired state, to purchase product(s) for which the total value is higher than a threshold amount. As another example, a constraint 202 may indicate that action(s) 124 are to be performed if the user 104 attempts, e.g., while in an impaired state, to purchase particular types of products such as weapons, tobacco products, alcohol, fireworks or other explosives, and so forth. The constraint(s) 202 may be specified by the user 104 to which they apply. In some instances, the constraint(s) 202 may be specified for the user 104 by other individual(s) (e.g., parent, guardian, etc.) and/or other entities (e.g., a court).

In some examples, a context of the user 104 may be determined based on sensor data 114 or other data. A constraint 202 may include one or more conditions 204 based on the context as well as state-related and/or financial-related conditions. A constraint 202 may also include condition(s) 204 that are based on other information in the user profile 120, such as whether the user 104 has an addiction. The context of the user 104 may include a current location of the user 104. The location may be based on GPS signals received at the user device 102, or may be determined using other techniques. A constraint 202 may indicate that action(s) 124 to be performed when the user 104 is at, near, and/or approaching a particular location or type of location (e.g., a gambling establishment) if the user 104 has a particular characteristic (e.g., a gambling addiction). In some instances, context may be determined based at least partly on image and/or audio data generated by the user device 102. For example, image(s) and/or audio may indicate that the user 104 is currently seated at a blackjack table or a slot machine, and action(s) 124 may be performed based on an inference that the user 104 is currently engaged in gambling or about to begin gambling. The location and/or other context of the user 104 may be employed to infer, or otherwise determine, a possibility or likelihood that the user 104 intends to make a financial commitment such as purchase(s) of a certain type or a particular type of activity (e.g., gambling, shopping, drinking alcohol, etc.).

Moreover, in some instances image and/or audio data may be employed to determine that the user 104 is about to sign a contract or otherwise enter into a legally binding agreement. For example, an image of a document may be captured by a camera of the user device 102, and the image may be scanned to look for legal terms, formatting, or other indications that the document is a legal document. Action(s) 124 may be performed if the user 104 is in an impaired state while attempting to enter into such an agreement.

In some implementations, the management engine 110 or other software module(s) may determine that the user 104 is exhibiting a change of personality (e.g., following a stroke, brain injury, etc.). If the user 104 has previously authorized another individual or an artificial intelligence (AI) agent to conduct their financial affairs according to a financial plan, budget, or goals, transaction(s) 106 that deviate from the plan, goal, and/or budget may be blocked following the detected personality change.

In some implementations, the generation of the sensor data 114 may be initiated (e.g., triggered) in response to the indication of a transaction 106 or possible transaction 106. For example, if the user 104 is known to have a shopping addiction, the location of the user 104 management engine 110 to signal the user device 102 to begin generating sensor data 114 to be analyzed to determine whether the user 104 is currently in an impaired state. In some instances, the user profile 120 may indicate a pattern of behavior in which the user 104 regularly performs transaction(s) 106 at a particular time and/or on a particular day. Based on the pattern, the generation of the sensor data 114 may be initiated prior to the usual time and/or day to enable determination of the user state 118 during the period of time when the user 104 typically initiates transactions 106.

In some implementations, the determination of the current user state 118 may be through comparison to an average or typical state of the user 104. For example, sensor data 114 may be generated for the user 104 over a period of time that includes various times of day, days of the week, and so forth. The data may be analyzed to determine a baseline (e.g., typical or average) physical, mental, and/or emotional state for the user 104. A subsequently determined user state 118 may be relative to the baseline state. For example, a user 104 may be determined to be angry if the current state 118 is angrier (e.g., substantially angrier) that the user's typical level of anger.

Figure 4:
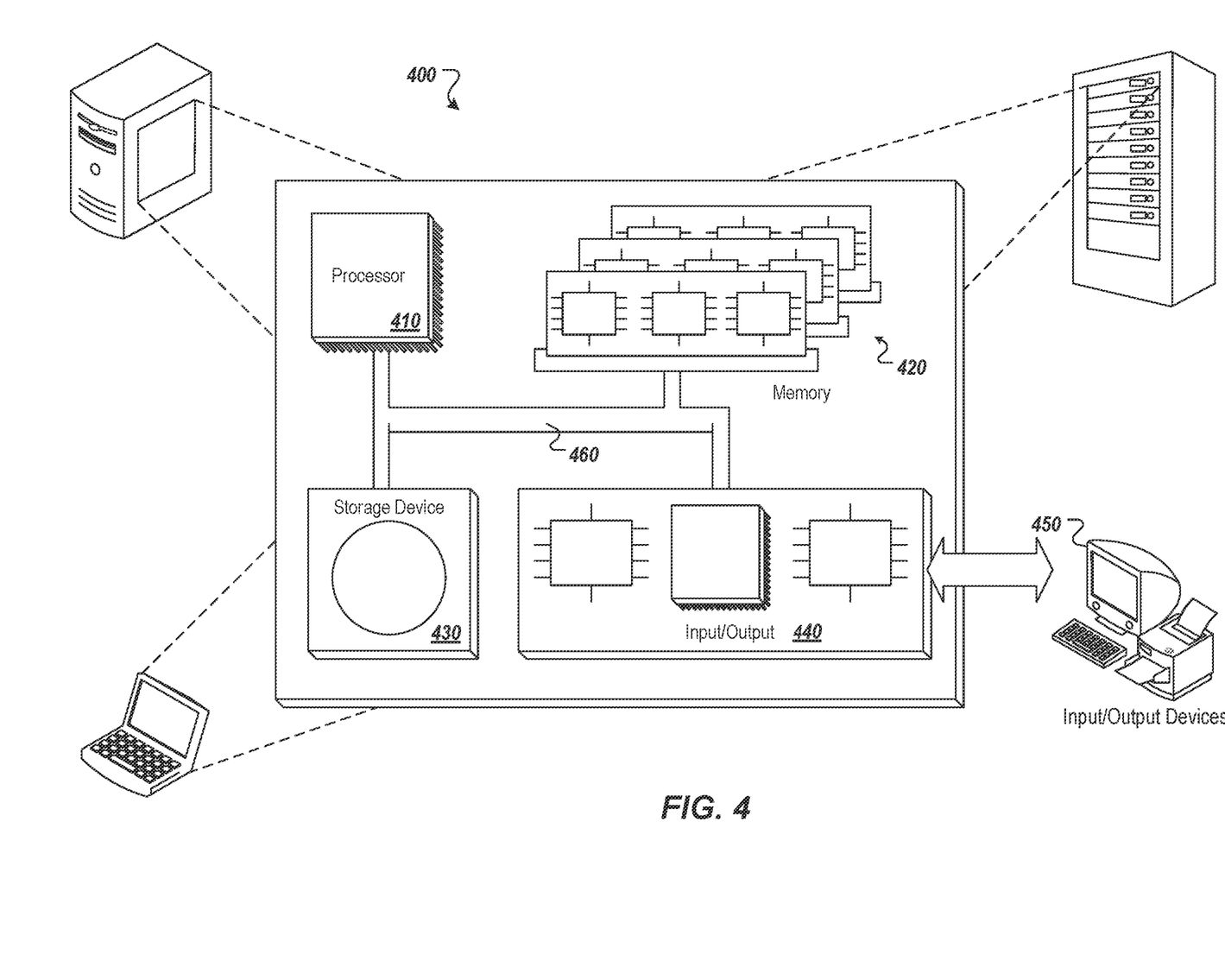
FIG. 4 depicts an example computing system, according to implementations of the present disclosure.

FIG. 4 depicts an example computing system, according to implementations of the present disclosure. The system 400 may be used for one or more of the operations described with respect to the various implementations discussed herein. For example, the system 400 may be included, at least in part, in one or more of the user device 102, the management device(s) 108, or other computing device(s) described herein. The system 400 may include one or more processors 410, a memory 420, one or more storage devices 430, and one or more input/output (I/O) devices 450 controllable through one or more I/O interfaces 440. The various components 410, 420, 430, 440, or 450 may be interconnected through at least one system bus 460, which may enable the transfer of data between the various modules and components of the system 400.

The processor(s) 410 may be configured to process instructions for execution within the system 400. The processor(s) 410 may include single-threaded processor(s), multi-threaded processor(s), or both. The processor(s) 410 may be configured to process instructions stored in the memory 420 or on the storage device(s) 430. The processor(s) 410 may include hardware-based processor(s) each including one or more cores. The processor(s) 410 may include general purpose processor(s), special purpose processor(s), or both.

The memory 420 may store information within the system 400. In some implementations, the memory 420 includes one or more computer-readable media. The memory 420 may include any suitable number of volatile memory units and/or non-volatile memory units. The memory 420 may include read-only memory, random access memory, or both. In some examples, the memory 420 may be employed as active or physical memory by one or more executing software modules.

The storage device(s) 430 may be configured to provide (e.g., persistent) mass storage for the system 400. In some implementations, the storage device(s) 430 may include one or more computer-readable media. For example, the storage device(s) 430 may include a floppy disk device, a hard disk device, an optical disk device, or a tape device. The storage device(s) 430 may include read-only memory, random access memory, or both. The storage device(s) 430 may include one or more of an internal hard drive, an external hard drive, or a removable drive.

One or both of the memory 420 or the storage device(s) 430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 400. In some implementations, the CRSM may include a data store that provides storage of computer-readable instructions or other information in a non-transitory format. The CRSM may be incorporated into the system 400 or may be external with respect to the system 400. The CRSM may include read-only memory, random access memory, or both. One or more CRSM suitable for tangibly embodying computer program instructions and data may include any suitable type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 410 and the memory 420 may be supplemented by, or incorporated into, one or more application-specific integrated circuits (ASICs).

The system 400 may include one or more I/O devices 450. The I/O device(s) 450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 450 may also include one or more output devices such as a display, LED(s), an audio output device (e.g., a speaker), a printer, a haptic output device, and so forth. The I/O device(s) 450 may be physically incorporated in one or more computing devices of the system 400, or may be external with respect to one or more computing devices of the system 400.

The system 400 may include one or more I/O interfaces 440 to enable components or modules of the system 400 to control, interface with, or otherwise communicate with the I/O device(s) 450. The I/O interface(s) 440 may enable information to be transferred in or out of the system 400, or between components of the system 400, through serial communication, parallel communication, or other types of communication. For example, the I/O interface(s) 440 may comply with a version of the RS-232 standard for serial ports, or with a version of the IEEE 1284 standard for parallel ports. As another example, the I/O interface(s) 440 may be configured to provide a connection over Universal Serial Bus (USB) or Ethernet. In some examples, the I/O interface(s) 440 may be configured to provide a serial connection that is compliant with a version of the IEEE 1394 standard.

The I/O interface(s) 440 may also include one or more network interfaces that enable communications between computing devices in the system 400, or between the system 400 and other network-connected computing systems. The network interface(s) may include one or more network interface controllers (NICs) or other types of transceiver devices configured to send and receive communications over one or more networks using any suitable network protocol.

Computing devices of the system 400 may communicate with one another, or with other computing devices, using one or more networks. Such networks may include public networks such as the internet, private networks such as an institutional or personal intranet, or any combination of private and public networks. The networks may include any suitable type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 400 may include one or more computing devices of any suitable type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and/or processor(s) of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method performed by at least one processor, the method comprising:
   retrieving, by the at least one processor, user profile data comprising a plurality of patterns of behavior associated with a user performing one or more transactions, wherein at least one of the plurality of patterns of behavior corresponds to a relationship between a location of the user and an expected time for performing at least one of the one or more transactions;
   receiving, by the at least one processor, biometric data representative of one or more physiological properties of the user in response to determining that the expected time is within a threshold amount of time, wherein the biometric data comprises movement of one or more hands, one or more arms, or one or more wrists of the user and is acquired by a device configured to be disposed on the one or more hands, the one or more arms, or the one or more wrists of the user;
   determining, by the at least one processor, a current state of the user based on a comparison between the biometric data and a behavioral model for the user generated based on historic biometric data associated with the user;
   receiving, by the at least one processor, sensor data representative of a current location of the user in response to determining that the expected time is within a threshold amount of time;
   accessing, by the at least one processor, constraint information describing:
      at least one financial constraint on the one or more transactions of the user with respect to at least one state of the user and a location of the user, wherein the at least one financial constraint comprises one or more limits to one or more purchases; and
      an alteration constraint for changing a security setting, wherein the security setting comprises a password, an access code, granting a computer device access, or any combination thereof;
   determining, by the at least one processor, whether the current state of the user corresponds to the at least one state of the user and the location of the user corresponds to the current location of the user; and
   performing, by the at least one processor, at least one action to a detected transaction during the threshold amount of time in response to determining that the current state of the user corresponds to the at least one state of the user and the location of the user corresponds to the current location of the user, wherein the at least one action comprises:
      preventing a transmission, over a network, of a signal to initiate the detected transaction based on the at least one financial constraint; and
      preventing a change to the security setting based on the alteration constraint.

2. The method of claim 1, wherein determining whether the current state of the user corresponds to the at least one state of the user comprises:
   determining a competency level of the user based on the current state of the user; and
   determining whether the detected transaction is allowed in view of the at least one financial constraint and the competency level of the user.

3. The method of claim 1, wherein the detected transaction comprises a purchase requested by the user.

4. The method of claim 1, wherein the biometric data comprises brain activity data, blood pressure data, heart rate data, body temperature data, perspiration data, blood sugar level data, or any combination thereof.

5. The method of claim 1, comprising determining a type of transaction associated with the current location.

6. The method of claim 1, wherein the device comprises a wristwatch computing device.

7. The method of claim 1, further comprising:
   transmitting, by the at least one processor, a second signal to instruct the device to acquire the biometric data in response to determining that the expected time is within a threshold amount of time.

8. The method of claim 1, wherein the at least one action includes:
  delaying the transaction for a time period; or
  transmitting, over the network, a message to at least one computing device associated with at least one other user, the message notifying the at least one other user of the transaction requested by the user and requesting approval of the transaction by the at least one other user.

9. The method of claim 1, wherein the at least one financial constraint is associated with a spending rule, a budget, a financial plan previously specified by the user, or any combination thereof.

10. One or more non-transitory computer-readable media storing instructions which, when executed by at least one processor, cause the at least one processor to perform operations comprising:
  retrieving, by the at least one processor, user profile data comprising a plurality of patterns of behavior associated with a user performing one or more transactions, wherein at least one of the plurality of patterns of behavior corresponds to a relationship between a location of the user and an expected time for performing at least one of the one or more transactions;
  receiving biometric data representative of one or more physiological properties associated with the user in response to determining that the expected time is within a threshold amount of time, wherein the biometric data comprises movement of one or more hands, one or more arms, or one or more wrists of the user and is acquired by a device configured to be disposed on the one or more hands, the one or more arms, or the one or more wrists of the user;
  determining a current state of the user based on a comparison between the biometric data and a behavioral model for the user generated based on historic biometric data associated with the user;
  receiving sensor data representative of a current location of the user in response to determining that the expected time is within a threshold amount of time;
  accessing constraint information describing:
    at least one financial constraint on the one or more transactions of the user with respect to at least one state of the user and a location of the user, wherein the at least one financial constraint comprises one or more limits to one or more purchases; and
    an alteration constraint for changing a security setting, wherein the security setting comprises a password, an access code, granting a computer device access, or any combination thereof;
  determining whether the current state of the user corresponds to the at least one state of the user and the location of the user corresponds to the current location of the user; and
  performing at least one action to a detected transaction in response to determining that the current state of the user corresponds to the at least one state of the user and the location of the user corresponds to the current location of the user, wherein the at least one action comprises:
    preventing a transmission, over a network, of a signal to initiate the detected transaction based on the at least one financial constraint; and
    preventing a change to the security setting based on the alteration constraint.

11. The non-transitory computer-readable media of claim 10, wherein the instructions which, when executed by the at least one processor, cause the at least one processor to perform the operations comprises determining whether the current state of the user corresponds to the at least one state of the user comprises:
  determining a competency level of the user based on the current state of the user; and
  determining whether the detected transaction is allowed in view of the at least one financial constraint and the competency level of the user.

12. The non-transitory computer-readable media of claim 10, wherein the detected transaction comprises an alteration of a security setting requested by the user.

13. The non-transitory computer-readable media of claim 10, wherein the instructions which, when executed by the at least one processor, cause the at least one processor to perform the operations comprises determining a type of transaction associated with the location of the user.

14. The non-transitory computer-readable media of claim 10, wherein the instructions which, when executed by the at least one processor, cause the at least one processor to perform the operations comprises determining the current state of the user based in part on biometric data generated by at least one biometric sensor.

15. The non-transitory computer-readable media of claim 10, wherein the instructions which, when executed by the at least one processor, cause the at least one processor to perform the operations comprises:
  transmitting a signal to instruct the device to begin acquiring the biometric data in response to determining that the expected time is within a threshold amount of time.

16. The non-transitory computer-readable media of claim 10, wherein the at least one action includes:
  delaying the transaction for a time period; or
  transmitting, over the network, a message to at least one computing device associated with at least one other user, the message notifying the at least one other user of the transaction requested by the user and requesting approval of the transaction by the at least one other user.

17. A system, comprising:
  at least one processor; and
  a memory communicatively coupled to the at least one processor, the memory storing instructions which, when executed by the at least one processor, cause the at least one processor to perform operations comprising:
    retrieving, by the at least one processor, user profile data comprising a plurality of patterns of behavior associated with a user performing one or more transactions, wherein at least one of the plurality of patterns of behavior corresponds to a relationship between a location of the user and an expected time for performing at least one of the one or more transactions;
    receiving biometric data representative of one or more physiological properties associated with the user in response to determining that the expected time is within a threshold amount of time, the biometric data comprises movement of one or more hands, one or more arms, or one or more wrists of the user and is acquired by a device configured to be disposed on the one or more hands, the one or more arms, or the one or more wrists of the user;
    determining a current state of the user based on a comparison between the biometric data and a behavioral model for the user generated based on historic biometric data associated with the user;

receiving, by the at least one processor, sensor data representative of a current location of the user in response to determining that the expected time is within a threshold amount of time;
accessing constraint information describing:
  at least one financial constraint on the one or more transactions of the user with respect to at least one state of the user and a location of the user, wherein the at least one financial constraint comprises one or more limits to one or more purchases; and
  an alteration constraint for changing a security setting, wherein the security setting comprises a password, an access code, granting a computer device access, or any combination thereof:
determining, by the at least one processor, whether the current state of the user corresponds to the at least one state of the user and the location of the user corresponds to the current location of the user; and
performing at least one action to a detected transaction in response to determining that the current state of the user corresponds to the at least one state of the user and the location of the user corresponds to the current location of the user, wherein the at least one action comprises;
  based on the at least one financial constraint, blocking the detected transaction, delaying the detected transaction for a time period, or transmitting, over a network, a message of the detected transaction requested by the user to at least one other computing device associated with at least one other user; and
  preventing a change to the security setting based on the alteration constraint.

* * * * *